United States Patent [19]

Hulsing, II

[11] Patent Number: 4,459,759

[45] Date of Patent: Jul. 17, 1984

[54] ANGULAR RATE AND POSITION TRANSDUCER FOR BOREHOLE SURVEY INSTRUMENT

[75] Inventor: Rand H. Hulsing, II, Redmond, Wash.

[73] Assignee: Sundstrand Data Control, Inc., Redmond, Wash.

[21] Appl. No.: 405,030

[22] Filed: Aug. 4, 1982

[51] Int. Cl.$^3$ .......................................... E21B 47/022
[52] U.S. Cl. ..................................... 33/304; 33/302; 33/366; 33/312; 33/363 K; 73/516 LM
[58] Field of Search ................ 33/304, 302, 308, 310, 33/313, 345, 363 K, 368, 391, 402, 366; 175/45; 73/516 LM, 515; 200/61.45 M

[56] References Cited

U.S. PATENT DOCUMENTS

| | | | |
|---|---|---|---|
| 2,856,238 | 10/1958 | Dacus | 308/10 |
| 3,277,304 | 10/1966 | Vyce | 250/203 |
| 3,313,161 | 4/1967 | Nordsieck | 74/5.6 |
| 3,323,377 | 6/1967 | Fraiser, Jr. et al. | 74/5.6 |
| 3,501,966 | 3/1970 | Shapiro et al. | 74/5.6 |
| 3,585,877 | 6/1971 | Kass et al. | 74/5.6 |
| 3,587,175 | 6/1971 | Armistead | 33/312 |
| 3,642,334 | 2/1972 | Atkinson | 308/10 |
| 3,693,142 | 9/1972 | Jones | 340/18 R |
| 3,771,118 | 11/1973 | Lichte, Jr. et al. | 33/308 |
| 3,806,913 | 4/1974 | Kerhoas et al. | 340/347 P |
| 3,927,474 | 12/1975 | Lapeyre et al. | 33/363 K |
| 4,130,942 | 12/1978 | Lapeyre | 33/312 |
| 4,199,869 | 4/1980 | Van Steenwyk | 33/302 |
| 4,207,463 | 6/1980 | Iyeta | 250/231 SE |
| 4,244,116 | 1/1981 | Barriac | 33/304 |
| 4,277,895 | 7/1981 | Wiklund | 33/366 |
| 4,293,046 | 10/1981 | Van Steenwyk | 33/304 |

Primary Examiner—Willis Little
Attorney, Agent, or Firm—Wood, Dalton, Phillips, Mason & Rowe

[57] ABSTRACT

A transducer for sensing the angular position or rate of change of displacement of a housing of a borehole survey instrument with respect to a reference position includes a rotor magnetically suspended within a stator which is in turn secured to the housing. The rotor is constrained by the magnetic suspension to rotate about a single axis relative to the stator. A frame of reference is established for the transducer, against which subsequent measurements are compared. Optical sensing means are included for sensing the movement of the rotor about the axis of motion to develop an indication of the angular position or rate of change of position of the housing.

14 Claims, 6 Drawing Figures

ANGULAR RATE AND POSITION TRANSDUCER FOR BOREHOLE SURVEY INSTRUMENT

DESCRIPTION

BACKGROUND OF THE INVENTION

The present invention relates generally to borehole survey instruments or apparatus, and more particularly to a transducer for sensing the angular displacement of a housing of a borehole survey instrument.

A borehole survey instrument is used to determine the trajectory of a borehole by means of inclinometers or accelerometers positioned to sense the inclination and azimuth of the borehole. This information is used in conjunction with the distance the survey instrument has traversed within the borehole to derive coordinates representing the position of the survey instrument with respect to a reference position, typically the point at which the borehole enters the earth.

In order to determine azimuth, it is necessary to establish and maintain a frame of reference which bears a fixed relationship to a reference direction. This typically is accomplished by means of magnetometers or gyroscopes mounted within the survey apparatus.

However, magnetometers and gyroscopes each have operational limitations which reduce the accuracy and/or reliability of the borehole survey apparatus. Magnetometers are adversely affected by magnetic anomalies in the earth's crust and require for their construction special low permeability metals. Gyroscopes, on the other hand, are particularly delicate instruments and are unsuitable for use in hostile environments, such as an oil well where high temperatures and rough handling are expected to be encountered.

SUMMARY OF THE INVENTION

In order to overcome the disadvantages noted above, there is provided a transducer for sensing the angular orientation of a housing of a borehole survey instrument which does not rely on a gyroscope or a magnetometer to establish and maintain a fixed frame of reference.

The transducer of the present invention consists of a cylindrical rotor magnetically suspended within a stator. The stator is in turn secured to the housing of the borehole survey instrument. The rotor is constrained by the magnetic field to rotate about a single axis relative to the stator substantially only in response to the inertia thereof. Means for sensing the rotation of the rotor relative to the stator includes a series of markings on a face of the rotor and optical sensing apparatus disposed on the stator for sensing the markings.

The rotor is initially caged with the stator so that it is at rest with respect thereto and the stator is aligned toward an initial position. The rotor is then spun at a constant initial rate to establish a frame of reference with respect to the initial position of the stator and housing of the instrument. The optical sensing apparatus senses the passage of the markings on the rotor relative to the stator and develops an output signal having a first frequency proportional to the initial rate. When the housing, and hence the stator, rotate from the initial position, the optical sensing apparatus develops an output signal having a second frequency different than the first frequency. The first and second frequencies are compared to develop an indication of the angular rate and angular position of the housing relative to the initial position.

Alternatively, the rotor may be left stationary with respect to a reference direction, and a direct indication of angular rate and position may be obtained from the optical sensing apparatus.

DESCRIPTION OF THE PREFERRED EMBODIMENT

Figure 1:
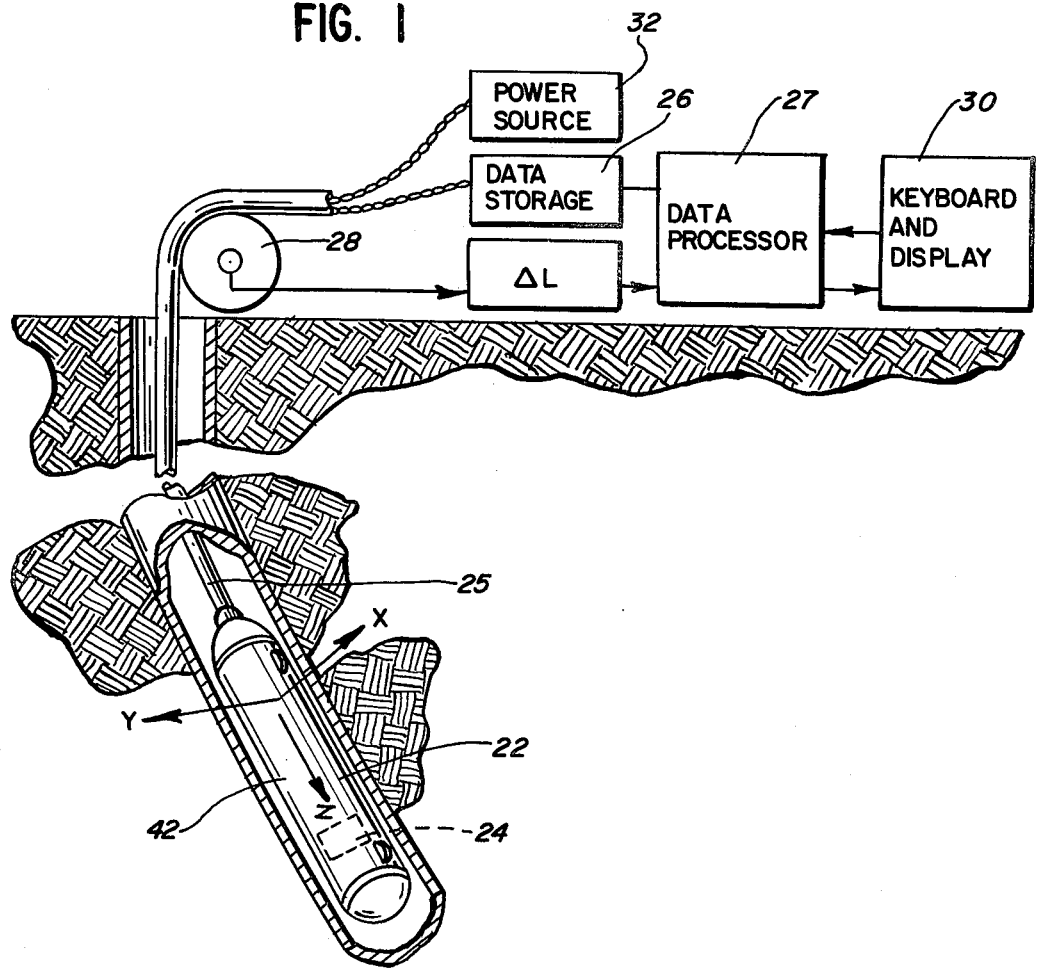
FIG. 1 is a broken diagram of a borehole surveying instrument with which the transducer of the present invention may be used.

Illustrated in FIG. 1 is a borehole survey instrument or apparatus for determining the trajectory of a borehole 20, such as an oil or gas well. The borehole 20 extends downwardly from a point 20a at the ground surface and is lined with a casing 21. The sensing apparatus includes a sensing probe 22 which is lowered into the borehole on a hoisting cable 25. The hoisting cable also includes conductors for supplying electrical power to the components of the probe and for directing signals from the probe to circuitry above ground at the well head.

A pair of accelerometers (not shown) are located in the sensing probe 22 and preferably have their sensitive axes X,Y at right angles to each other defining a measurement plane at right angles to the longitudinal axis of the probe section. A third accelerometer may also be used which has its sensitive axis Z parallel to the longitudinal axis of the probe 22.

The probe 22 is mounted on the hoisting cable 25 in such a way as to be freely rotatable within the casing 21. In order to allow accurate measurement of the local trajectory of the borehole regardless of the rotational position of the probe 22 within the casing 21, a transducer 24 according to the present invention is mounted within the probe 22. The transducer 24 develops output signals used to generate an indication of the angular position of the probe 22 relative to a reference direction. The signals from the transducer 24 and the accelerometer signals are coupled to a data storage unit 26 and a data processor 27 which derive a representation of borehole trajectory. A further input to the data processor 27 is from a transducer 28 associated with hoisting cable 25 to provide a signal L indicating the distance of the sensing probe 22 within the borehole 20.

A keyboard and display 30 interacts with the data processor 27 to generate a representation of borehole trajectory in terms of coodinate dimensions in a three axis system. The keyboard provides for operator input and control. The representation of the borehole trajectory may be printed or recorded for future use.

Power for the components located within the sensing probe 22 is provided by a power source 32 located above ground level.

The borehole survey is carried out by causing the probe to move through the borehole from one end to the other in either direction while data is collected and processed. The survey may be conducted as the probe is lowered in the borehole or as it is raised from the bottom. For increased accuracy, data may be collected as the probe moves in each direction and the survey results averaged.

The borehole azimuth measurements by the accelerometers are referenced to the outside world by establishing a frame of reference for the transducer 24 of the present invention, as noted more specifically below.

TRANSDUCER STRUCTURE AND OPERATION

Figure 2:
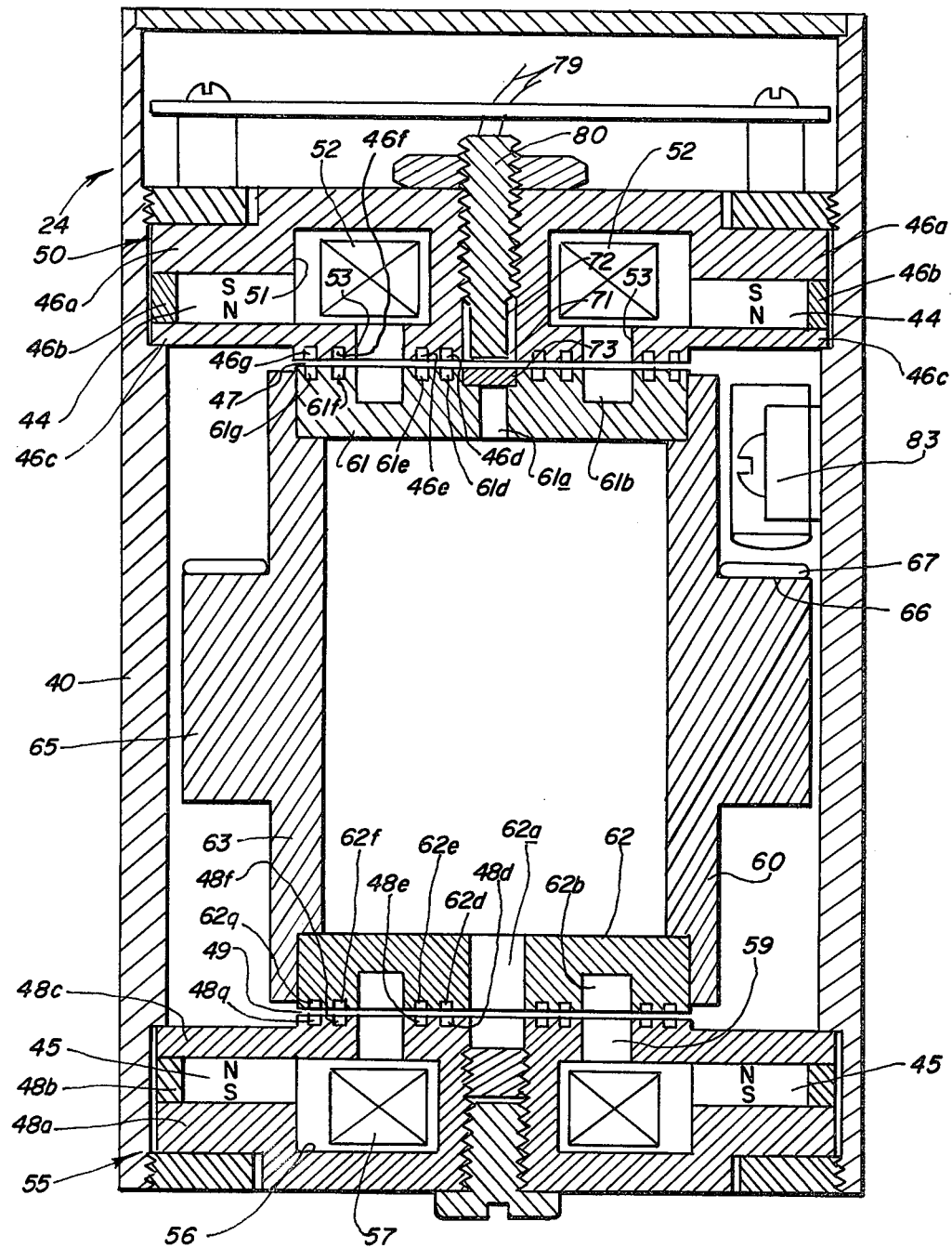
FIG. 2 is a sectional view of the transducer of the present invention.

Referring now to FIG. 2, there is shown in greater detail the transducer 24 of the present invention. The transducer includes a stator 40 which is secured to a housing 42 of the probe 22 so that relative motion between the two is prevented.

The stator 40 includes two ring-shaped permanent magnets 44 and 45, which, in the preferred embodiment are made of samarium cobalt. Disposed adjacent to the permanent magnet 44 is a magnetic flux return path comprising three ferromagnetic pole pieces 46a,46b,46c which direct the magnetic flux developed by the magnet 44 to an air gap 47 located adjacent the ends of the pole pieces 46a,46c. A pair of circumferential grooves 46d, 46e are machined or otherwise formed in an end face of the pole piece 46a and a pair of similar circumferential grooves 46f,46g are formed in an end face of the pole piece 46c. The grooves 46d–46g concentrate the magnetic flux developed by the magnet 44 and transmitted by the pole pieces 46a–46c in particular regions of the air gap 47 for reasons discussed below.

A set of pole pieces 48a,48b,48c, similar to the pole pieces 46a–46c are disposed adjacent to the permanent magnet 45. The pole pieces 48a,48c contain grooves 48d,48e and 48f,48g, respectively in the end faces thereof. The grooves 48d–48g serve the same purpose as the grooves 46d–46g.

Disposed within a cylindrical recess 51 in the magnetic structure 50 formed by the pole pieces 46a,46c is a coil 52 which can be used to modify the strength of the magnetic field produced by the magnet 44. The magnet 44, coil 52 and the pole pieces 46a–46c together comprise a first cylindrical magnetic structure 50. The magnetic structure 50 also includes a cylindrical slot 53 which separates the pole piece 46a from the pole piece 46c.

Likewise, the magnet 45 and the pole pieces 48a–48c together comprise a second cylindrical magnetic structure 55 having a cylindrical recess 56 within which is disposed a coil 57 similar to the coil 52. A cylindrical slot 58 similar to the slot 53 separates the pole pieces 48a,46c.

Disposed between the magnetic structures 50 and 55 is a cylindrical rotor 60 having a longitudinal axis parallel to the axis of the housing 42. The rotor 60 includes first and second end members 61,62 secured to the ends of a cylindrical body 63. The first end member 61 includes a central aperture 61a and circumferential grooves 61d–61g in a face of the end member 61 which are located directly opposite the grooves 46d–46g, respectively. A cylindrical slot 61b is located directly opposite the cylindrical slot 53 in the magnetic structure 50.

Similarly, a series of circumferential grooves 62d–62g are disposed in a face of the end member 62 directly opposite the grooves 48d–48g in the magnetic structure 55. A cylindrical slot 62b is disposed directly opposite the cylindrical slot 59.

The magnetic structure 50 and the end member 61 together comprise a magnetic circuit with magnetic flux in the air gap 47 being concentrated by the grooves 46d–46g and 61d–61g to provide radial centering forces for the rotor 60. Similarly, the magnetic structure 55 and the second end member 62 form a magnetic circuit with radial centering of the rotor 60 being accomplished by the grooves 48d–48g and 62d–62g.

In the preferred embodiment, the pole pieces 46a–46c, 48a–48c and the first and second end members 61,62 are made of iron.

The body 63 of the rotor 60 includes an enlarged diameter portion or flywheel 65 which provides a high degree of rotational inertia for the rotor 60. The body 63 is made of a nonmagnetic material and may be of high mass to obtain the desired inertial effect.

Disposed on an upper face 66 of the flywheel 55 is a graduated ring 67 which, in the preferred embodiment is made of glass epoxy resin. As seen specifically in FIG. 3, a series of markings or stripes 68 (not all of which are shown) forming a series of alternating light reflective and nonreflective portions are disposed on a face 69 of the graduated ring 67 adjacent its outer periphery. In the preferred embodiment, the graduated ring 67 includes 4096 reflecive copper traces, approximately one mil each in width equally spaced about the periphery thereof. The traces may be plated to provide a high degree of reflectivity, and may be formed by an etching process, or by any other suitable process directly on the face 69.

The magnetic suspension is stable for motions in the radial direction with respect to the longitudinal axis of the rotor and for rotation about the axes transverse to the longitudinal axis. The magnetic suspension is neutral for rotation about the cylindrical axis, i.e. the rotor 60 may freely rotate about its own axis. However, the magnetic suspension has one unstable degree of freedom for motions along the cylindrical axis. This degree of freedom is stablized by an active servo position control 70 which includes a position detector 71 consisting of a sensing coil 72 disposed in a central recess 73 of the magnetic structure 50 and an aluminum disk 74 disposed in an enlarged opening 75 of the central aperture 61a of the first end member 61.

Figure 4:
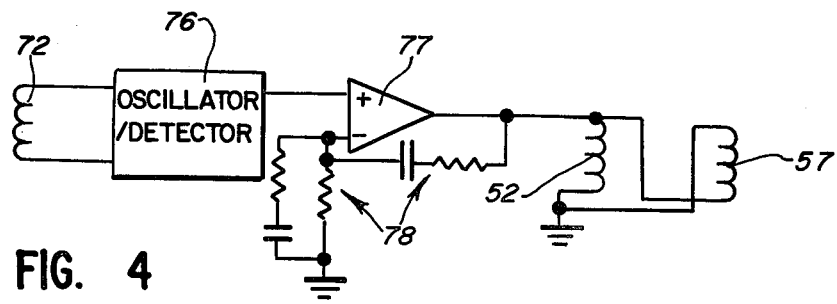
FIG. 4 is a schematic diagram of circuitry for controlling the axial position of the rotor shown in FIG. 2.

Referring also to FIG. 4, the sensing coil 72 is connected in a feedback path of an oscillator/detector circuit 76. The sensing coil 72 is coupled to the oscillator detector circuit 76 by means of leads 70 which pass through a threaded sleeve 80 disposed within the central recess 73. The Q, or efficiency, of the oscillator circuit 76 is determined by the proximity of the aluminum disk 74 to the sensing coil 72. The oscillator/detector circuit 76 develops an output signal which is coupled to the noninverting input of an operational amplifier, or op amp 77, with the output signal being a measure of the distance between the aluminum disk 74 and the sensing coil 72.

The op amp 77 includes phase lead circuitry 78 to provide electrical damping along the servoed axis. The signal from the op amp 77 is coupled to the coils 52,57 to control the magnetic fields produced by the magnetic structures 50,55, to control the suspension of the rotor therebetween. The rotor is therefore constrained to move only about its axis, with other types of motions being damped by eddy currents associated with modifications of the magnetic fields.

The rotor 60 is suspended between the magnetic structures 50,55 by the attractive forces caused by interaction of the magnetic field set up by the stator magnets 44,45 and the magnetic coils 52,57. This configuration results in a substantially frictionless bearing for the rotor 60 provided that the magnetic fields set up by the magnetic structures 50,55 have good magnetic symmetry, as noted more specifically below.

Figure 3:
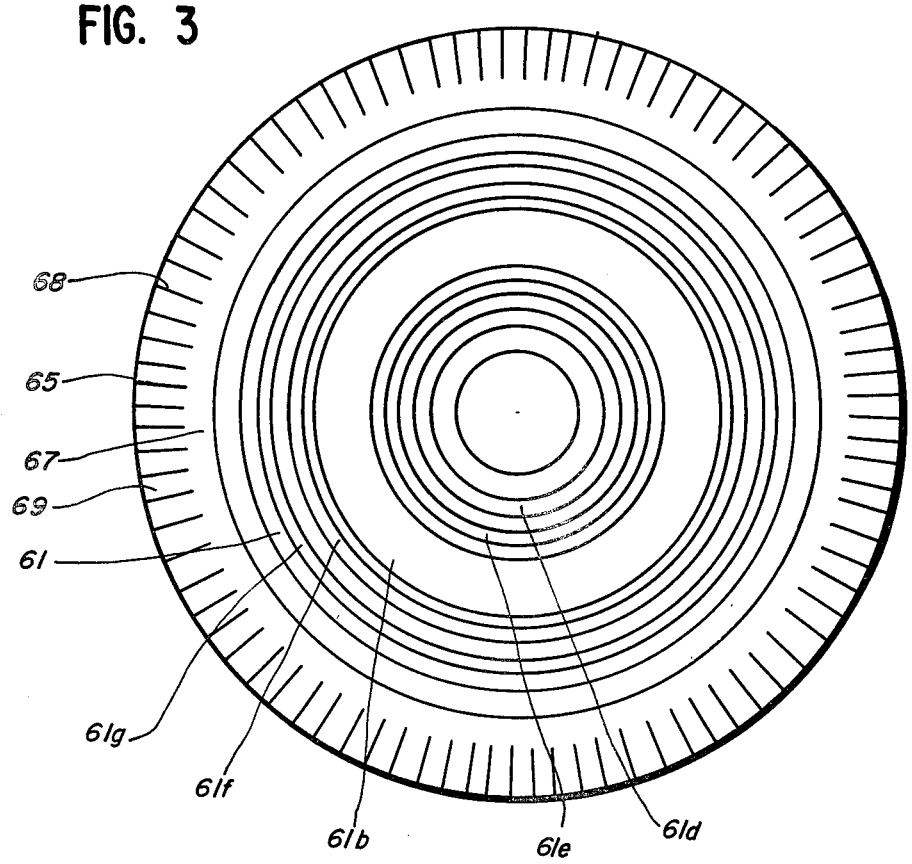
FIG. 3 is a plan view of the rotor shown in FIG. 2.

As seen specifically in FIG. 3, a series of markings or stripes forming a series of alternating light-reflective and nonreflective portions are disposed on a face 51 of the rotor 60 adjacent its outer periphery. In the preferred embodiment, the rotor includes 4096 reflective copper traces, approximately 1 mil each in width, equally spaced about the periphery of the rotor. The traces may be plated to provide a high degree of reflectivity, and may be formed by an etching process, or by any other suitable process directly on the face 51.

Rotational displacement of the rotor 60 relative to the stator 40 is sensed by optical sensing apparatus 83 comprising an LED 84 and a pair of photodetectors 86,88, in the form of diode detectors, which are mounted on the stator 40. The LED illuminates a portion of the face 69 of the rotor in the vicinity of the stripes 68. The diode detectors 86,88 sense the presence or absence of reflected light from a particular portion of the face 69 and develop output signals in accordance therewith. The signals from the detectors 86,88 are coupled to logic circuitry 90 (not shown in FIG. 2), also disposed on the stator 40, which develops output signals indicating angular displacement or rate of change thereof.

The LED 84 should illuminate at least the combined width of light-reflective portion and a nonreflective portion. The fields of view of the diode detectors 86,88 may be of a size equal to $1\pm\frac{1}{2}$ times the width of a light-reflective stripe, with a field of view equal to $1\frac{1}{2}$ times the width of a stripe 68 being the preferred size. In other words, diode detectors 86,88 should be capable of sensing the presence of a light reflective stripe 68 within a field $1\frac{1}{2}$ times as large as the width of a stripe 68. Moreover, the field of view of the diode detectors are separated by $\frac{1}{2}$ of the width of a stripe 68.

The gain of the photodetectors 86,88 is not critical, i.e. the gain can be set so that the presence of a light reflective stripe 68 is sensed at a time when the stripe occupies any position within the field of view. For example, the stripe presence may be sensed as soon as the leading edge of the stripe pierces the field of view of a diode detector, or may be sensed only when substantially all of the width of a stripe is in the field of view.

The coils 52,57 are not only used to control the axial position of the rotor 60 but are also energizable to deactivate the magnetic suspension to "cage" the rotor, i.e. bring it into contact with the stator 40. The coils 52,57 are utilized to establish a known condition for the rotor 60 prior to the taking of measurements with the borehole survey apparatus.

For example, before the probe shown in FIG. 1 is lowered into the borehole, the rotor 60 may be caged with the stator 40 and the sensing probe 22 aligned toward a reference or initial direction so as to be at rest with respect thereto. The coils 52,57 are then de-energized so that the rotor 60 is suspended in a substantially frictionless manner within the stator 40. At this point, the rotor 60 may be rotated at a slow constant speed or rate relative to the stator 40 to minimize the effects of variations in the magnetic fields set up by the magnetic suspension, or may be left stationary relative to the probe 22 and stator 40, in which case the constant rate is equal to zero. In either case, a frame of reference is established against which later measurements are compared. It should be noted that the term "frame of reference" is intended to include both a rotating and stationary reference frame.

The sensing probe 22 is then lowered into the borehole 20 during which the sensing probe 22 may rotate from the reference direction within the casing 21 of the borehole 20. This in turn causes the stator 40 to rotate relative to the rotor 60 at a rate different than the constant rate. The rate at which such rotation occurs is sensed by the optical sensing apparatus consisting of the stripes 68, the LED 84 and the diode detectors 86,88.

Figure 5:
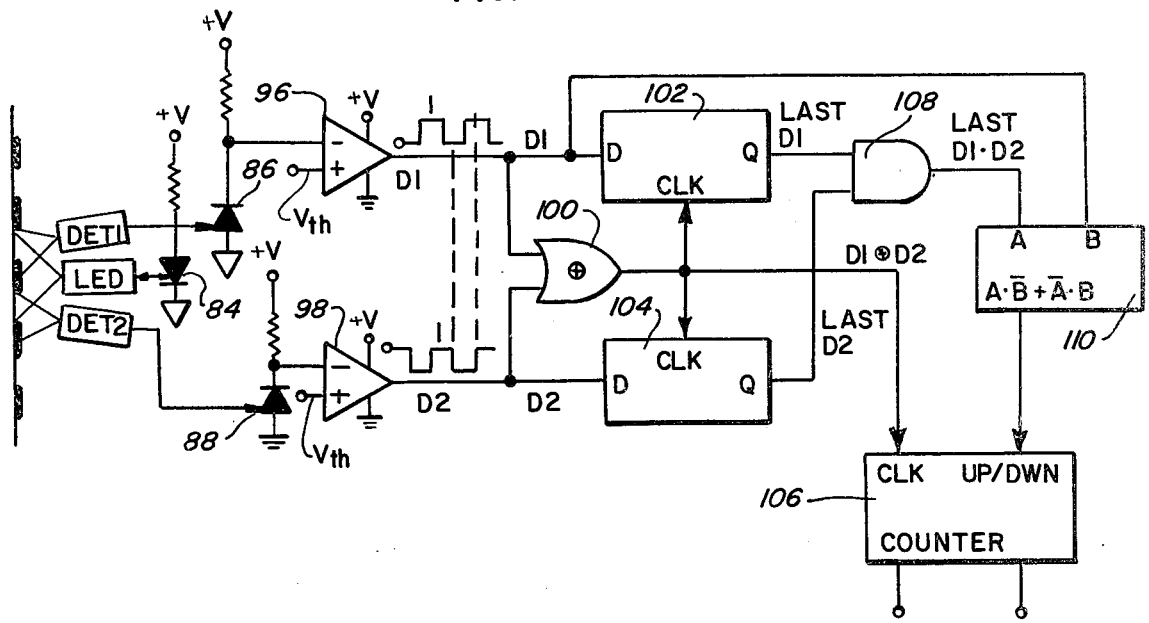
FIG. 5 is a schematic diagram of circuitry for detecting the output of the optical sensing apparatus shown in FIG. 2.

Referring also to FIG. 5, as relative motion occurs between the stator 40 and rotor 60, the stripes pass beneath the LED 84 and detectors 86,88 causing the detectors to alternately conduct and shut off. The detectors 86,88 are coupled to the inverting inputs of two comparators 96,98, respectively, both of which receive a reference voltage $V_{th}$ at their noninverting inputs. The comparators switch between high and low logic states and generate output signals D1,D2 in response to the switching of the detectors 86,88.

The threshold $V_{th}$ should be higher than the highest anticipated output from the diode detectors 86,88 resulting from the sensing of a nonreflective portion of the rotor 60 to prevent erroneous signalling. Moreover, the threshold may be selected so that a wide voltage and temperature variation may be tolerated.

The outputs from the comparators 86,88 are combined in an exclusive OR gate 100 to provide clock signals to a pair of D flip flops 102,104 and to a counter 106. The outputs D1,D2 from the comparators 96,98 are coupled to the inputs of the D flip flops 102,104, respectively, and are transferred to the Q outputs thereof by the leading edge of a positive-going clock signal from the exclusive OR gate 100.

The signals from the Q outputs of the flip flops 102,104 are combined in an AND gate 108 and are coupled to logic circuits 110 for performing the following logical function:

$A\cdot\bar{B}+\bar{A}\cdot B$ where A and B are the inputs to the circuitry 110. The A input to the logic circuitry 110 is coupled to the output of the AND gate 108 while the B input is coupled to the output D1 from the comparator 96. Therefore, the output from the logic circuitry 110 is equal to:

LAST (D1·D1)·D1+LAST (D1·D2)·D1 where LAST (D1) and LAST (D2) are the outputs from the D flip flops 102,104, respectively.

The output from the logic circuitry 110 is coupled to an UP/DOWN control for the counter to increment or decrement the number represented by the digital ouput signal thereof.

The circuitry shown in FIG. 5 will be described in conjunction with the timing diagrams for the signals D1 and D2 and the resulting clock signal shown in FIG. 6. When one of the diode detectors 86,88 senses light reflected from the rotor 60, the diode detector conducts. The voltage coupled to the inverting input of the corresponding comparator 96 or 98 therefore drops, causing the output of the comparator to assume a high state.

Figure 6:
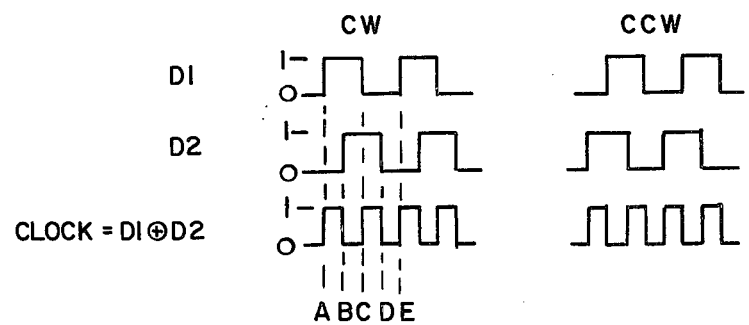
FIG. 6 is a timing diagram of signals developed by the circuitry of FIG. 4.

For example, as shown in the timing diagram in the left-hand portion of FIG. 6, when the rotor as seen in FIG. 3 is moving clockwise relative to the stator, the detector 86 will sense the presence of a light reflective portion while the detector 88 detects one of the nonreflective portions. The time at which the output from comparator 96 assumes a high state is denoted time A.

At time A, a clock pulse is developed which causes the Q outputs of the flip-flops 102,104 to assume the states of the outputs D1,D2 of the comparators 96,98 existing prior to time A, i.e. the outputs of both flip-flops are low. At this time, the current state of D1 is high.

Consequently, the output of the logic circuitry 110 is high, as evidenced by the following logical equation:

$$UP/DOWN = (0 \cdot 0) \cdot \overline{1} + \overline{(0 \cdot 0)} \cdot 1$$
$$= 0 + 1 = 1$$

and therefore the UP/DOWN control signal causes the counter 106 to increment the pulses from the exclusive OR gate 100.

At time B the detector 88 senses a light reflective portion and hence the output of the comparator 98 assumes a high state. Since the diode detector 86 is still sensing the light reflective portion, the output of the exclusive OR gate 100 drops to a low state.

At time C, the detector 86 senses a nonreflective portion, and hence the output of the comparator 96 drops to a low state. The output of the exclusive OR gate 100 immediately assumes a high state and provides a clock pulse to the counter 106. At this point, the UP/DOWN control signal continues to be in a high state as shown by the following calculation:

$$UP/DOWN = (1 \cdot 1) \cdot \overline{0} + \overline{(1 \cdot 1)} \cdot 0$$
$$= 1 + 0 = 1$$

and hence the counter continues to increment clock pulses.

At time D, the output from the comparator 98 drops to a low state due to the sensing of a nonreflective portion by the detector 88, and hence the outputs of both comparators 96,98 are in a low state. The detector 86 next senses the presence of a light reflective portion at time E, at which point the cycle previously described repeats.

When the rotor 60 as viewed in FIG. 3 rotates relative to the stator 40 in a counterclockwise direction, a light reflective portion will be first sensed by the diode detector 88. Hence, the UP/DOWN control signal will assume a low state as shown by the following equation:

$$UP/DOWN = (0 \cdot 0) \cdot \overline{0} + \overline{(0 \cdot 0)} \cdot 0$$
$$= 0 + 0 = 0$$

Consequently, the number represented by the counter output signal will be decremented by one for each clock pulse developed by the exclusive OR gate 100. It should be noted that the UP/DOWN control signal will remain in a low state until clockwise rotation of the rotor occurs.

In the preferred embodiment, the size of the counter 106 and the number of stripes disposed on the face of the rotor 60 are selected so that one rotation of the rotor relative to the stator 40 fills the counter and causes the counter to roll over back to zero.

The output of the counter 106 may be set to zero before measurements are taken and when the rotor 60 is to remain at rest relative to the initial position so that the output of the counter 106 during measurements represents the number of light reflective stripes (or alternatively non-light reflective portions) that have traversed the detectors 86,88. By disposing the stripes at equal angular increments from each other, one may readily obtain a measure of the angular displacement of the housing of the sensing probe 22 relative to the initial angular position. For example, the data processor 27 may be programmed to multiply the output of the counter 106 by the angular distance between adjacent stripes to obtain an indication of angular displacement.

Further, the frequency of the signal appearing at the least significant bit of the output of the counter 106 may be used as an indication of the rate of change of angular displacement of the housing 42 and stator 40 with respect to the rotor 60. If the rotor 60 was initially at rest relative to the casing 21 of the borehole, then this output provides a signal frequency which is proportional to the angular velocity of the housing of the sensing probe 22 relative to the casing 21.

If, prior to taking measurements, the rotor 60 was spun at a constant rate relative to the stator (which was initially at rest relative to the reference or initial position) then the output of the counter 106 will increment or decrement at a first predetermined frequency or rate, providing that the housing 42 of the sensing probe 22 does not rotate from its initial position. However, if the housing 42 and stator 40 do rotate from the initial position, then the output of the counter 106 will increment or decrement at a second frequency or rate different than the first. The difference between the first and second rates is then proportional to the rate of change of angular displacement of the housing of the sensing probe 22.

An indication of angular displacement or rate of displacement in this instance may be obtained from the circuitry of FIG. 4 in one of several ways. For example, rate information may be obtained by utilizing a reference oscillator which develops a signal having a frequency equal to the predetermined frequency. The outputs from the reference oscillator and the least significant bit output of the counter 106 may be coupled to frequency counters which develop digital output signals which are combined in a subtractor to obtain the rate information. The subtractor may also be coupled to an integrator which develops a signal representing the amount of angular displacement occurring as the probe 22 is lowered into the borehole.

An alternative procedure to obtain angular displacement information is to utilize the predetermined frequency established by spinning the rotor 60 at the constant rate relative to the stator 40 to obtain a time base, and using the time base to directly measure angular excursions. For example, if the rotor is spun at a constant rate of 10 rpm relative to the stator 40, then the rotor will complete one full revolution every six seconds. Therefore, a particular output from the counter 106, e.g. the signal corresponding to the number 1000, should also be encountered every six seconds as long as the initial rate of rotation of the rotor relative to the stator is maintained. This time base of six seconds may then be used to measure angular excursion or displacement by timing a six second interval beginning with the generation of the particular output, (i.e. 1000) and by noting the output of the counter 106 at the end of the six second interval. The amount by which this number varies from 1000 multiplied by the angular distance between stripes results in a measure of angular displacement of the probe 22 relative to its initial position.

To obtain angular rate information in this way, a second timer may be used to measure the time required for the rotor 60 to complete one full revolution. The length of time or interval required for this to occur may be converted to frequency information and compared to the reference frequency (in this case the frequency of the output of the counter 106 corresponding to 10 rpm) to obtain a measure of the average angular velocity of the housing 42 in the borehole during the interval.

Transducer Design

In order to produce a satisfactory device utilizing the above-noted principles, it is necessary to carefully consider the following design criteria:
(1) linear acceleration capability;
(2) magnetic suspension symmetry;
(3) air drag on high relative rotor rotations; and
(4) maximum logic data rate.

In the case of the first criteria, if the suspension force produced by the repulsion of the stator and rotor magnets is denoted $F_m$, then the maximum acceleration along the axis of the rotor to which the transducer can be subjected is equal to $F_m/m$, where m is the mass of the rotor. Therefore, to maximize the accerlation capability of the transducer, it is desirable to design the stator magnetic circuits to produce strong magnetic fields. However, as previously noted, the rotor should be designed to be relatively heavy so as to have sufficient rotational inertia to smooth out any effects caused by nonsymmetric magnetic fields. A balance must be struck between the linear accelertion capability of the device and the ability of the rotor to move strictly under its own inertia. This balance can be resolved in favor of increased linear acceleration capability if the second design criteria relating to the symmetry of the magnetic fields produced by the magnetic structures 50 and 55 are met. In any event, $F_m/m$ must be larger than 1 g. in order to have a useful device.

The second design criteria relates to the symmetry of the magnetic fields about the rotor 60. If the magnetic fields have a nonsymmetrical gradient component, then there will be an angular position relative to the stator where the rotor 60 will tend to come to rest. This problem may be overcome by providing the rotor with sufficient mass and/or by spinning the rotor prior to taking measurements so that the rotational inertia of the rotor overcomes and averages out the disturbances caused by the nonsymmetrical field gradient. This allows precise measurements to be made in spite of a nonuniform magnetic suspension field.

On the other hand, if the magnetic field uniformity about the rotor axis is good, then the rotor 60 will be free to spin substantially only in response to its own inertia. Therefore, the rotor need not be spun at a constant rate prior to taking measurements, and the mass of the rotor can be reduced, in turn improving the linear acceleration capability of the transducer.

The third design criteria relates to the air drag on the rotor as it rotates relative to the stator. The surfaces of the rotor 60 should be made quite smooth to reduce air drag effects. It is evident then that the stripes disposed on the face 69 of the graduated ring 67 should have a negligible thickness to minimize drag. The objective relative to this design criteria is to provide the rotor with a configuration which prevents more than a negligible amount of displacement of air as the rotor rotates relative to the stator.

When the stator is vibrated, the rotor 60 may wobble in the gap between the magnetic structures 50,55 in turn resulting in turbulence and increased drag. At a given rotor speed, drag would result in an angular drift buildup similar to that which occurs in conventional gyros. However, since the transducer of the present invention is used to detect small relative angular displacement rates, the error introduced by drag should be negligible. In fact, the air between the rotor and stator should dampen wobbling motions of the rotor in the stator and aid in the centering of the rotor between the magnetic structures 50,55.

The fourth design criteria relating to logic data rate is primarily concerned with the selection of appropriate electrical components to accommodate high relative rotations between the rotor 60 and stator 40. As the rotor rotates relative to the stator, logic gate switching occurs. If low power CMOS circuitry is used for the apparatus shown in FIG. 4, switching rates slightly under 1 megahertz could be accommodated. Moreover, the flip flops 102,104 shown in FIG. 4 are triggered by the leading edge of the clock signal from the exclusive OR gate 100 to increase the speed of the logic. If, as in the preferred embodiment, the graduated ring includes 4096 stripes disposed on the face thereof, then a maximum limit of 15,000 rpm may be detected. The device of the present invention is therefore capable of measuring rotational displacements occurring at a rate exceeding those rates expected to be encountered in borehole survey apparatus.

I claim:
1. A transducer for sensing the angular position of a borehole survey instrument housing with respect to a reference position, comprising:
a rotor;
a stator secured to the housing;
means for magnetically suspending the rotor within the stator whereby the rotor is constrained to rotate about a single axis relative to the stator;
means for sensing movement of the rotor about the axis of rotation to develop an indication of the angular position of the housing, the sensing means including a plurality of markings disposed on a face of the rotor and means for optically sensing the markings on the rotor, the optical sensing means comprising a light-emitting diode for illuminating a portion of the markings, a photodetector for sensing an illuminated marking and a second photodetector mounted on the stator with the light-emitting diode and the first photodetector and having a field of view displaced from the field of view of the first photodetector by one-half the width of a marking, the photodetectors generating a pulse when a marking is in its field of view; and
means for detecting the output of the photodetectors to develop an output signal representing the angular position of the housing relative to the reference position including means for gating the pulses from the photodetectors to develop clock pulses, means for counting the clock pulses to develop the output signal, and means for developing a control signal representing the direction of rotation of the rotor relative to the stator, wherein the clock pulse counting means includes a control input coupled to the control signal developing means causing the clock pulse counting means to increment and decrement the output signal in response to the control signal.

2. A transducer for sensing the angular position of a borehole survey instrument housing with respect to a reference position, comprising:
   a rotor;
   a stator secured to the housing;
   means for magnetically suspending the rotor within the stator whereby the rotor is constrained to rotate about a single axis relative to the stator; and
   means for sensing movement of the rotor about the axis of rotation to develop an indication of the angular position of the housing wherein the sensing means includes a plurality of markings disposed on a face of the rotor and means for optically sensing the markings on the rotor, the optical sensing means having a light-emitting diode for illuminating a portion of the markings, a first photodetector for sensing an illuminated marking and a second photodetector mounted on the stator with the light-emitting diode and the first photodetector and having a field of view displaced from the field of view of the first photodetector by one-half the width of a marking.

3. The transducer of claim 2, further including means for detecting the output of the photodetectors to develop an output signal representing the angular position of the housing relative to the reference position.

4. The transducer of claim 3, wherein each photodetector generates a pulse when a marking is in its field of view, and wherein the detecting means includes means for gating the pulses from the photodetectors to develop clock pulses and means for counting the clock pulses to develop the output signal.

5. A transducer for sensing the angular position of a borehole survey instrument housing with respect to a reference position, comprising:
   a rotor;
   a stator secured to the housing;
   means for magnetically suspending the rotor within the stator whereby the rotor is constrained to rotate about a single axis relative to the stator, including first and second spaced-apart structures wherein the rotor is suspended between the magnetic structures and means for interrupting the magnetic fields produced by the magnetic structures so that the rotor moves in response to motion of the stator about the rotor axis; and
   means for sensing movement of the rotor about the axis of rotation to develop an indication of the angular position of the housing.

6. A method of sensing the rotation of a housing of a borehole survey instrument relative to a reference position utilizing a rotor disposed in a stator secured to the housing, the method comprising:
   (a) establishing a frame of reference for the stator;
   (b) magnetically supporting the rotor in a substantially frictionless manner within the stator such that relative motion between the rotor and stator can occur about the axis of the rotor substantially only in response to the inertia thereof;
   (c) moving the borehole survey instrument along a path; and
   (d) measuring the rotational displacement of the housing relative to the frame of reference by sensing the rotation of the rotor relative to the stator.

7. The method of claim 6, wherein the step (a) includes the step of aligning the stator toward a reference position.

8. The method of claim 7, wherein the step (a) includes the step of spinning the rotor at a constant rate.

9. The method of claim 8, wherein the step (d) includes the step of sensing the movement of markings disposed on the rotor relative to the stator.

10. The method of claim 9, wherein the step (d) further includes the steps of:
    generating pulses each time a marking moves past a point; and
    accumulating the pulses in a counter.

11. The method of claim 10, wherein the step (d) further includes the steps of:
    determining the direction of relative movement between the rotor and stator; and
    controlling the accumulation of pulses in the counter in accordance with the direction of relative movement.

12. The method of claim 10, wherein the controlling step includes the steps of:
    decrementing the output of the counter when the direction of relative movement is in a first direction; and
    incrementing the output of the counter when the direction of relative movement is in a second direction.

13. A method of sensing the rotation of a housing of a borehole survey instrument utilizing a rotor disposed within a stator secured to the housing, the method comprising the steps of:
    (a) caging the rotor with the stator;
    (b) aligning the rotor and stator toward a reference direction;
    (c) magnetically supporting the rotor in a substantially frictionless manner;
    (d) moving the borehole survey instrument through the borehole; and
    (e) measuring the rotational displacement of the instrument housing and stator relative to the position of the rotor.

14. A method of sensing the rotation of a housing of a borehole survey instrument utilizing a rotor disposed within a stator secured to the housing, the method comprising the steps of:
    (a) magnetically supporting the rotor in a substantially frictionless manner within the stator;
    (b) spinning the rotor at a constant rate relative to the stator;
    (c) moving the borehole survey instrument through the borehole; and
    (d) measuring the rate of relative motion between the rotor and stator to obtain an indication of the rotation of the housing.

* * * * *